United States Patent

Yamakawa

Patent Number: 5,065,358
Date of Patent: Nov. 12, 1991

[54] TEXT PROCESSING APPARATUS FOR ADJUSTING PAGINATION TO ACCOMMODATE A SECOND TEXT FIELD ON A PAGE

[75] Inventor: Kiyoshi Yamakawa, Gifu, Japan

[73] Assignee: Brother Kogyo Kabushkik Kaisha, Aichi, Japan

[21] Appl. No.: 218,141

[22] Filed: Jul. 13, 1988

[30] Foreign Application Priority Data

Jul. 22, 1987 [JP] Japan .............................. 62-182606
Sep. 10, 1987 [JP] Japan .......................... 62-138784[U]

[51] Int. Cl.⁵ ...................... G06F 3/023; G06F 3/12; G06F 15/02; G06F 13/14
[52] U.S. Cl. ................................ 364/419; 364/225.8; 364/225.9; 364/226.1; 364/225.7; 364/235; 364/245.6; 364/245.5; 364/260; 364/943.43; 364/943.4; 364/943.5; 364/943; 364/930; 364/967; 364/967.1; 364/DIG. 1; 364/DIG. 2
[58] Field of Search ............... 364/519, 200 MS File, 364/900 MS File; 400/70, 582, 54, 83, 620, 706

[56] References Cited

U.S. PATENT DOCUMENTS 4,138,719 2/1979 Swanstrom et al. ................. 364/200
4,398,246 9/1983 Frediani et al. ..................... 364/200
4,651,288 3/1987 Zeising ................................ 364/519
4,686,649 11/1987 Rush et al. .......................... 364/900
4,687,353 8/1987 DeGeorge et al. .................... 400/76
4,889,439 12/1989 Cook et al. ......................... 400/706

OTHER PUBLICATIONS

R. G. Bluethman et al., IBM Technical Disclosure Bulletin, Page-End Control, vol. 17, No. 4, Sep. 1974, p. 962.
R. C. Nielsen, IBM Technical Disclosure Bulletin, Adjusting a Cross Page End Code for Pagination, vol. 24, No. 11B, Apr. 1982, p. 5860.

Primary Examiner—Thomas C. Lee
Assistant Examiner—Daniel H. Pan
Attorney, Agent, or Firm—Oliff & Berridge

[57] ABSTRACT

A text processing apparatus, if data constituting a headline, title or the like distinction of a text are positioned in predetermined upper or low lines of a current page of the text, transfers a part of textual data to the preceding or the next page, so that the line includes the data constituting a headline, title or the like distinction is positioned at the head of a page. The apparatus detects a line having no character data in a page of entered data, transfers a part of data to the preceding or the next page according to the result of the detection, and prints out the data edited as abovementioned.

4 Claims, 7 Drawing Sheets

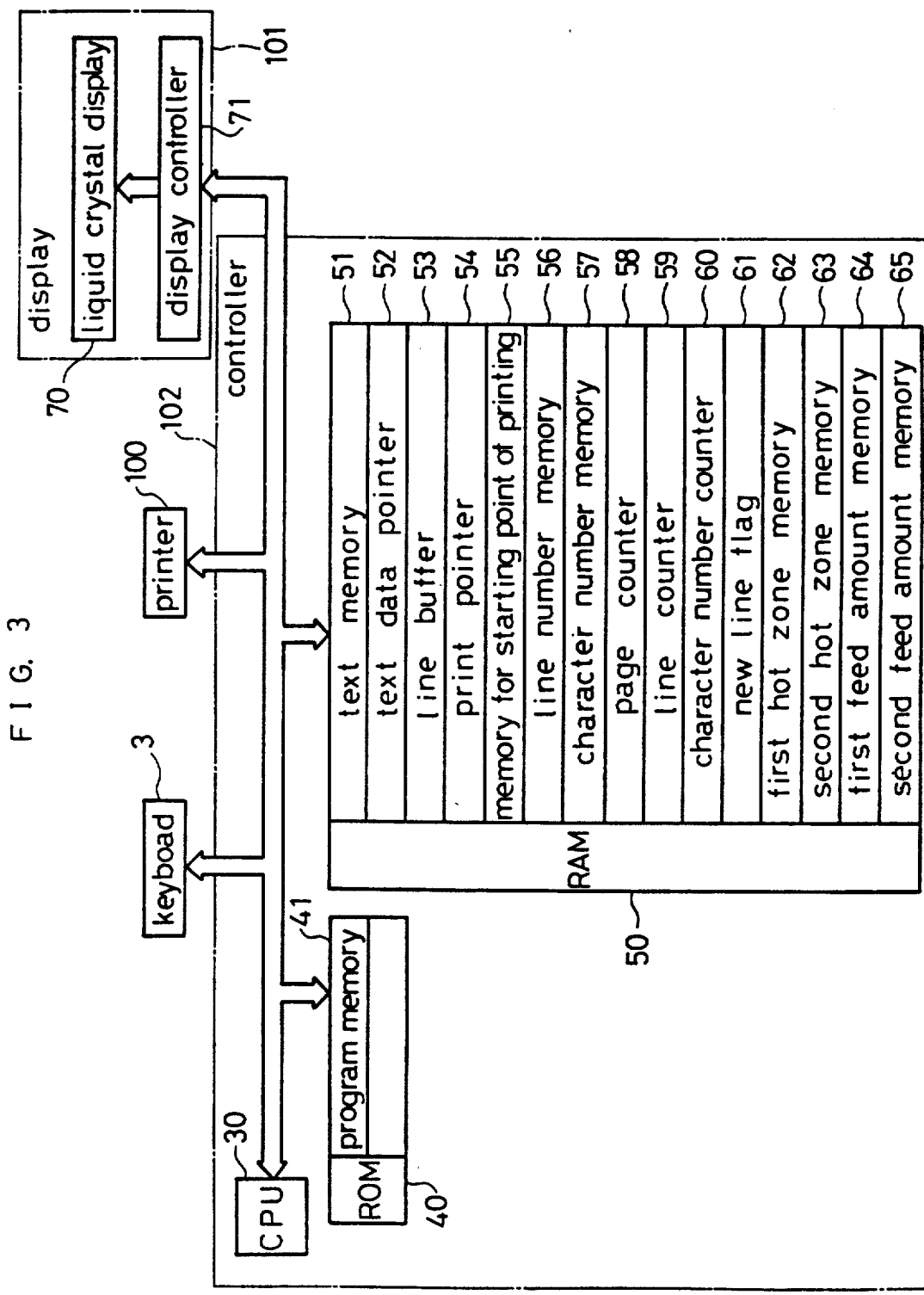
F I G. 3

TEXT PROCESSING APPARATUS FOR ADJUSTING PAGINATION TO ACCOMMODATE A SECOND TEXT FIELD ON A PAGE

BACKGROUND OF THE INVENTION AND RELATED ART STATEMENT

The present invention relates to a text processing apparatus and especially to a text processing apparatus which, when a headline, title or the like distinction of a text is positioned in predetermined upper or lower lines of a page, transfers a part of textual data in the current page to the preceding or the next page so that the line including the headline, title or the like distinction is positioned at the head of a page.

It is conventionally known that a text processing apparatus such as an electronic typewriter has a text memory in which entered data are stored, and the stored data in the text memory are successively read out to be printed on a printing medium.

Usually in printing textual data by such text processing apparatus, a printing format including the number of lines in a page, the number of characters in a line, line feed amount and the like is set according to paper size, layout and the like by prelominarily operating printing format seting keys, and then by operating a key for starting printing, textual data read out of the text memory are successively printed according to the printing format.

In printing textual data by a conventional text processing apparatus, textual data are successively printed according to a predetermined printing format, irrespective of the content of the textual data. Consequently, for example, a title which provides a distinction in the content of the textual data is sometimes printed on the bottom line of a page, which makes documents having indistinct content and hard to read.

Relating now to prior art, an apparatus is known which, if a word at the end of a line of entered textual data extends beyond the right hand margin of a display, automatically transfers this word to the beginning of the next line, as shown in Bristish Patent No. 1533499 entitled "Improvement relating to text processing apparatus". Further, similarly known are an apparatus for producing automatically justified printed matter as shwon in U.S. Pat. No. 3,512,132 entitled "Composing apparatus with table lookup mode", and another apparatus for providing an output copy having a controlled right hand edge as shown in U.S. Pat. No. 3,757,921 entitled "Right hand margin control system". However, these prior art references have not disclosed at all how to process textual data when a headline, title or other distinction of a text is positioned in upper or lower lines of a page.

SUMMARY OF THE INVENTION

An object of the present invention is to provide a text processing apparatus which, when it detects a line having no character data in predetermined lines in a page of entered data, transfers at least a part of data in the predetermined lines of the current page to the preceding or the next page so as to produce a document having apparent distinctions.

Another object of the present invention is to provide a text processing apparatus which can change the line pitch of entered character data arranged to each page, according to the number of the lines of entered character data arranged to each page, thereby to produce a document easy to read and giving an impression of uniformity.

In a text processing apparatus according to the present invention, and as illustrated in FIG. 1 controller as a main component of the apparatus comprises a detection routine for running a detection routing S100 by detecting a line having no character data in predetermined lines of entered data in a page, an editing routine for running an editing routing S200 by transferring at least a part of the data in the predetermined lines of the current page to the preceding or the next page according to a result of the detection by the detection routine, and an output control program for running an output control program S300 by transmitting the data edited by the editing routine to the printer, 100.

In a text processing apparatus according to the present invention, if the detection routine detects a line having no character data which is provided for a distinction in predetermined lines of entered data in a page, the editing routine transfers at least a part of the data in the predetermined lines of the current page to the preceding or the next page according to a result of the detection by the detection routine.

Then, the printer is controlled according to the data edited in the above mentioned manner, and newly edited one page of data are printed out.

In other words, if there is a distinction in the predetermined lines of a page, data before the distinction are transferred to the preceding page or data after the distinction are transferred to the next page.

According to a text processing apparatus of the present invention, if there is a distinction of text in the predetermined lines of a page, data before the distinction are transferred to the preceding page or textual data after the distinction are transferred to the next page, so that documents having apparent distinctions and easy to read can be printed out.

Further, if a part of data are transferred to the preceding page, a predetermined line pitch in the preceding page is changed according to the number of lines of data transferred to the preceding page by a first line pitch changing routine. If the above mentioned part of data is transferred to the next page, a mean value of already set line pitches of all the pages preceding to the current page is computed and the line pitch in the current page is changed according to the result of the computation by a second line pitch changing routine.

Then, the printer is controller by the controller according to the data edited in such a manner, and a newly edited page of data including the above mentioned edited data are printed out.

According to a text processing apparatus of the present invention, it can be prevented that line pitches are extremely different between pages of a document.

BRIEF DESCRIPTION OF THE DRAWINGS

FIG. 3 is a block diagram of a control system of the electronic typewriter of the first embodiment;

DETAILED DESCRIPTION OF PREFERRED EMBODIMENT OF THE INVENTION

Figure 4A:
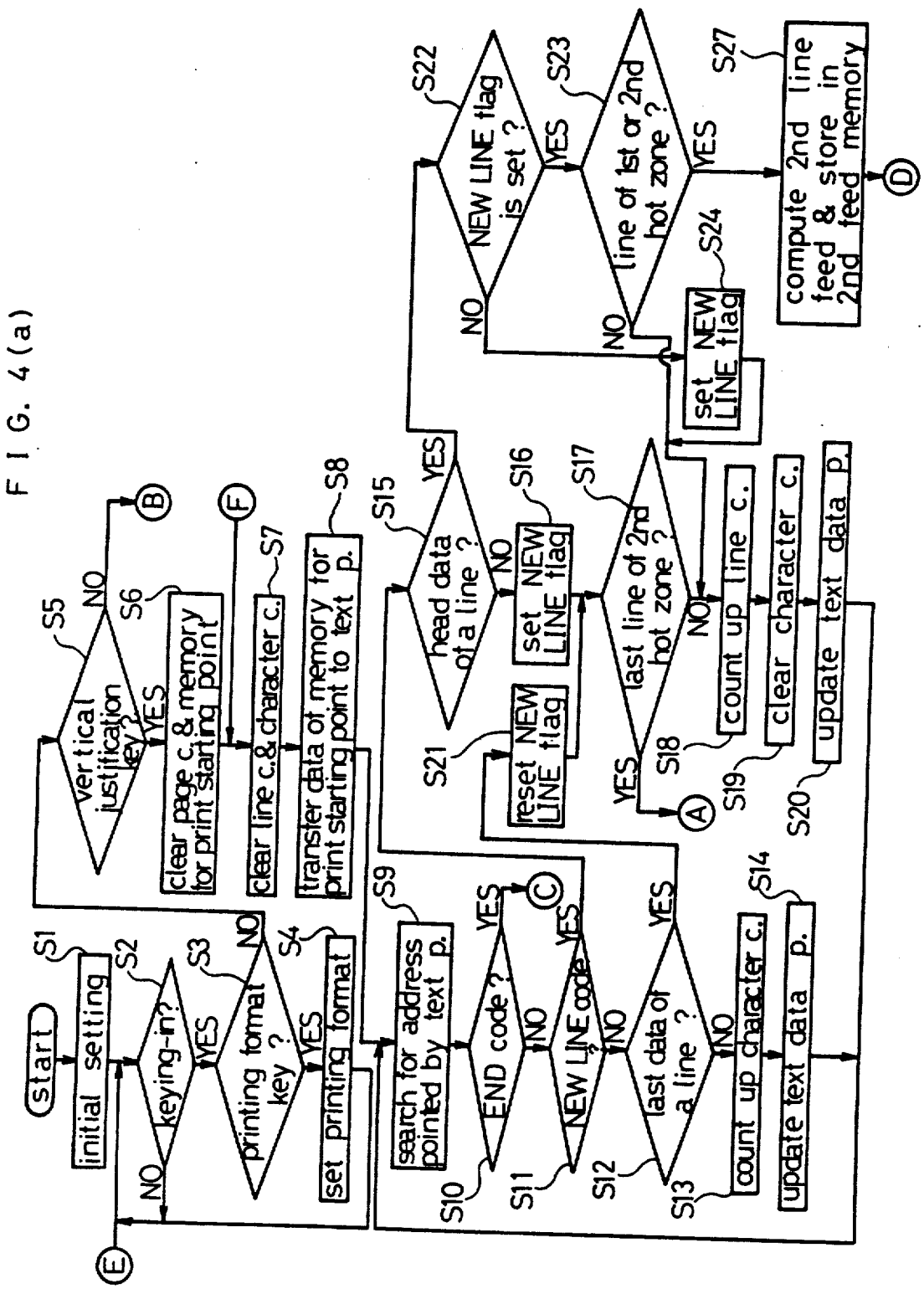
FIGS. 4a, 4b are flow charts of a routine of a vertical justification control of the electronic typewriter of the first embodiment.
Figure 4B:
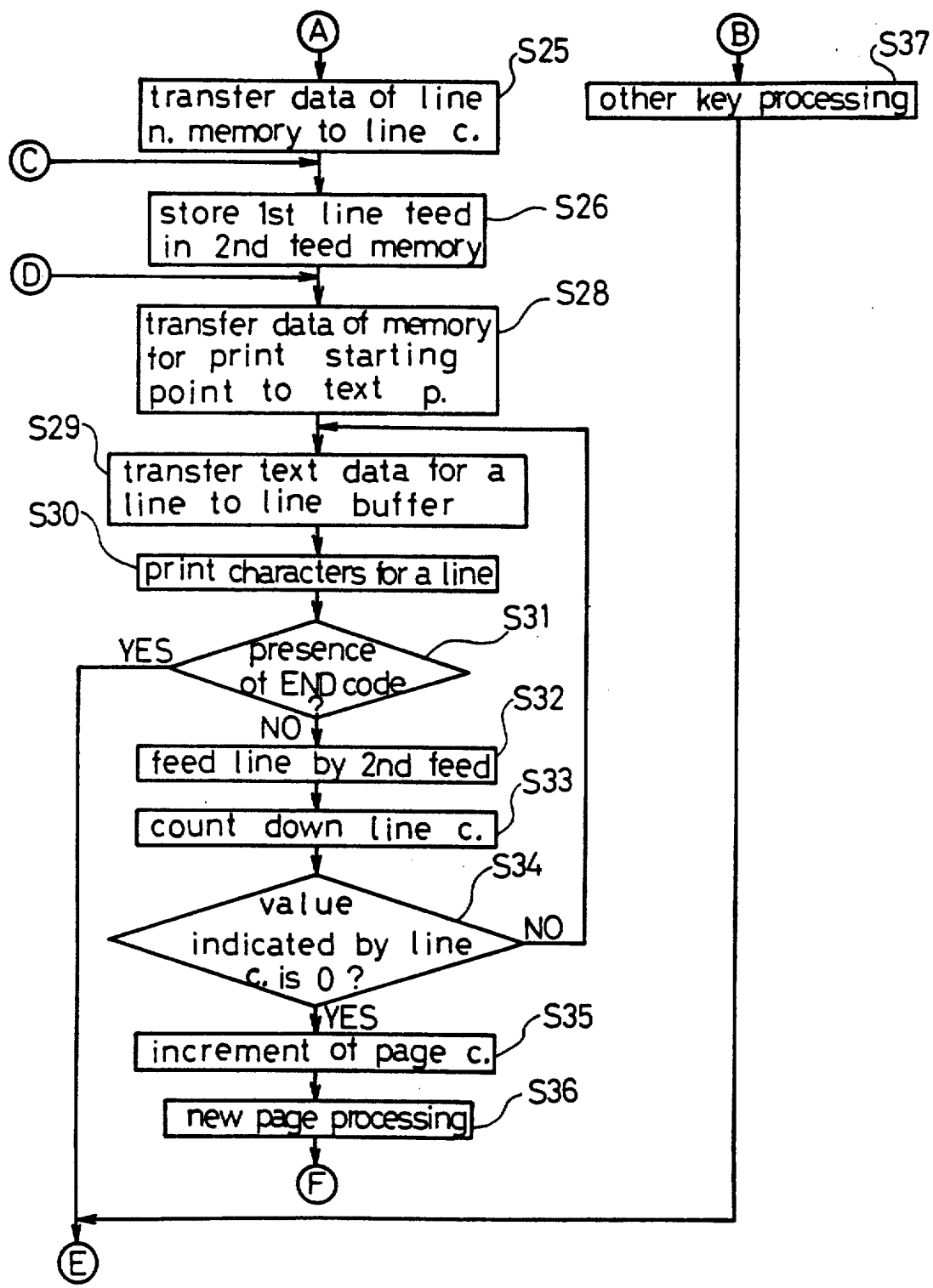

Now, a first embodiment of the present invention will be described below with reference to FIGS. 2 to 4.

The first embodiment is an electronic typewriter to which the present invention is applied.

Figure 1:
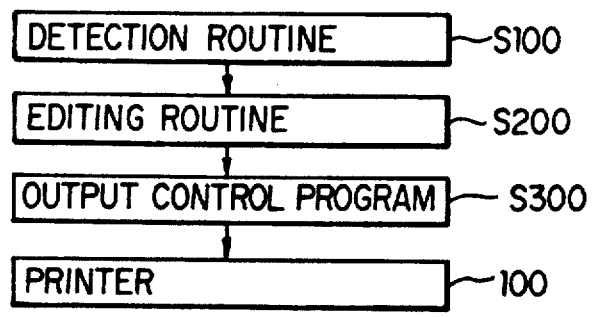
FIG. 1 is a block diagram showing the arrangement of the present invention.
Figure 2:
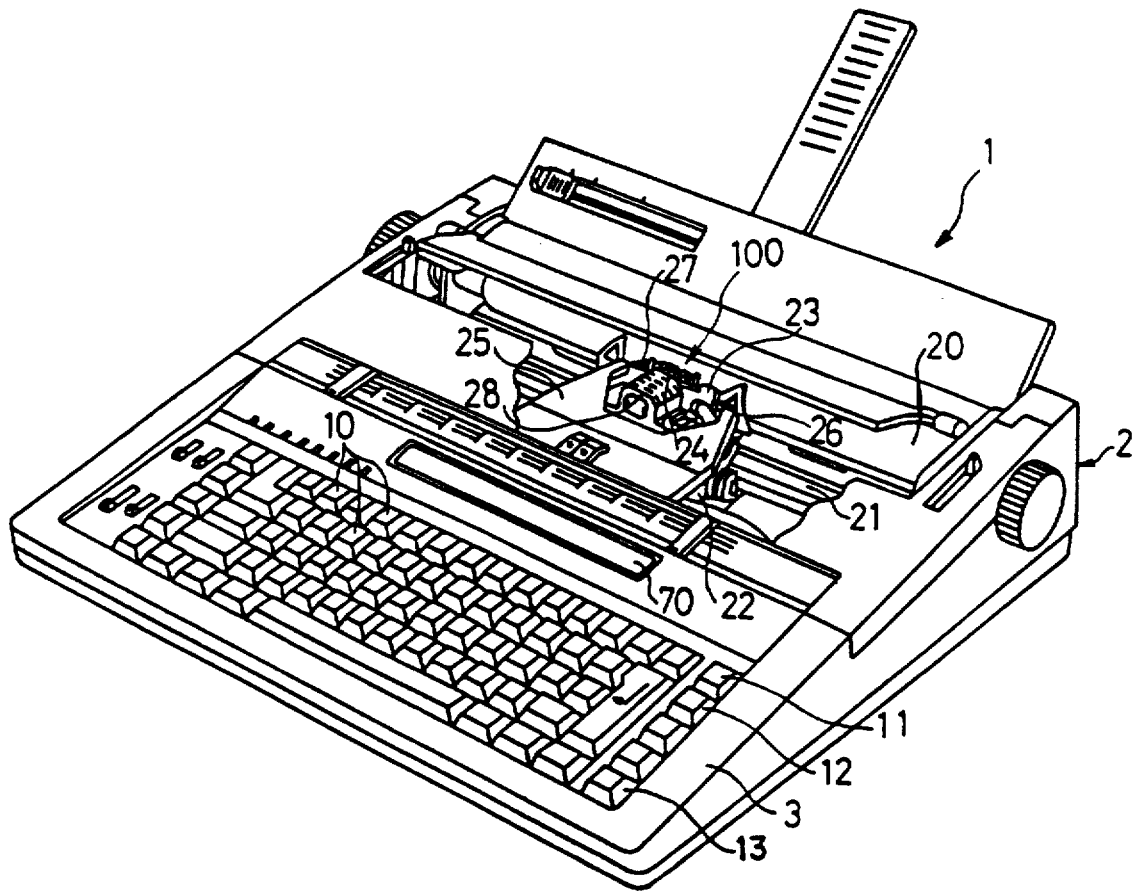
FIG. 2 is a perspective view of an electronic typewriter of a first embodiment of the present invention.

As shown in FIG. 2, a keyboard 3 is provided at the front part of a frame 2 of an electronic typewriter 1. A printer 100 is provided on the frame 2 behind the keyboard 3, and a liquid crystal display 70 for displaying entered characters, symbols and the like is also provided behind the keyboard 3. On the keyboard 3 are provided character keys 10 including alphabet keys, numeral keys and symbol keys, a printing format setting key 11, a vertical justification key 12 for starting the belowmentioned vertical justification control, a mode setting key 13 for setting Memory mode for storing data entered by operating the keyboard 3 and other various function keys which are provided in a conventional typewriter.

The printer 100 comprises at least a platen 20 for transferring printing paper (not shown), a motor for driving the platen and a driving circuit therefor, a carriage 22 supported by a guide bar 21 in parallel with the platen 20, a motor for laterally reciprocating the carriage 22 and a driving circuit therefor, a type wheel 24 contained in a wheel cassette 23, a motor for driving the type wheel 24 and a driving circuit therefor, a printing ribbon 26 contained in a ribbon cassette 25, a motor for winding up the printing ribbon 26 and a driving circuit therefor, a printing hammer (not shown) for striking types 27 on the type wheel 24, a solenoid 28 for driving the hammer and a driving circuit therefor, and the like. This printer 100 is the same as that of a usual electronic typewriter.

Now, the whole arrangement of a control system of the electronic typewriter will be described with reference to the block diagram of FIG. 3.

The electronic typewriter mainly comprises a keyboard 3, a printer 100, a display device 101, a controller 102 and the like. The keyboard 3, the printer 100, the display device 101 are connected through a data bus or the like to CPU (control processing unit) 30 of the controller 102.

The controller 102 comprises CPU 30, and ROM (read only memory) 40 and RAM (random access memory) 50 which are connected through a data bus or the like to CPU 30.

In a program memory 40 of ROM 41, stored are control programs for controlling the printer 100 and the display device 101 according to code data entered by means of character keys 10 and various function keys on the keyboard 3, control programs for the below mentioned vertical justification control and the like.

The RAM 50 comprises, in addition to various kinds of memories and the like in which results of processing in CPU 30 are temporarily stored, a text memory 51 in which entered data are stored as file data, a text data pointer 52 for pointing each data stored in the text memory 51 successively in order of address, a line buffer 53 in which one printing line of data from the text memory 51 are stored, a print pointer 54 for pointing each data stored in the line buffer 53 successively in order of address, a memory 55 for starting position of printing in which starting positions of printing in pages respectively are successively stored by means of addresses of the next memory 51, a line number memory 56 in which the number of lines printed in a page is stored, a character number memory 57 in which the number of characters printed in a line is stored, a page counter 58 for counting pages, a line counter 59 for counting lines printed in a page, a character counter 60 for counting characters printed in a line, a new line flag (return flag) 61 which is set only when there is a New Line code (return code) in a line, first hot zone memory 62 in which a starting line of a hot zone(a first hot zone) consisting of a few lower lines in the current page is stored, a second hot zone memory 63 in which an end line of another hot zone (a second hot zone) consisting of a few upper lines in the next page is stored, a first feed amount memory 64 in which a line feed amount (a first line feed amount) determined in setting a printing format is stored, a second feed amount memory 65 in which another line feed amount (a second line feed amount) in printing the current page is stored, and the like.

Here, a zone spreading from a predetermined line in the current page determined in setting a printing format to the bottom line (bottom margin position) in the current page is referred to as the first hot zone, and another zone spreading from the first line (top margin position) in the next page to a predetermined line determined in setting the printing format is referred to as the second hot zone. At the end of data stored in the text memory 51, a special End code for indicating the end of text data is stored.

CPU 30 in Memory mode stores data entered by means of character keys 10 through the line buffer 53 into the text memory 51 and at the same time display characters and notations in correspondence with the entered data on the display 70.

In printing textual data stored in the text memory 51, a line of textual data transferred from the text memory 51 to the line buffer 53 is successively pointed by the printing pointer 54, and characters and symbols in correspondence with the data are printed by the printer 100.

The display device 101 is of a usual construction and comprises a display 70 which is liquid crystal display and a display controller 71 for issuing driving signals to the display 70.

Now, a vertical justification control carried out by the controller 102 of the electronic typewriter will be described with reference to the flow chart of FIG. 4.

By turning on an electric source for the typewriter, the operation advances to STEP S1 (hereinafter referred to only as S1 and the following STEPs are similarly referred to) where initial setting is performed, and then keying-in is detected in S2.

Here, by operating the mode setting key 13, Memory mode is set. Then, by operating the printing format setting key 11, the answer in S3 is judged Yes and the program advances to S4.

In S4, desired numerical data entered indicating the number of lines to be printed in a page, the number of characters to be printed in a line, the first hot zone, the second hot zone and the first line feed amount are stored respectively in the line number memory 59, the character number memory 60, the first hot zone memory 62, the second hot zone memory 63 and the first feed amount memory 64, thus to set the printing format and the program returns to S2. Keying is performed so as to enter data into the text memory 51, then the program going through S3 and S5 to S37, where processing according to the keying is performed. And after desired text data are stored in the text memory 51, the vertical justification control is started by pressing a vertical justification key 12, and the program advances through S2 and S3 to S5, where it is judged Yes and the program advances to S6. In S6, the page counter 58 and the memory 55 for the starting point of printing are cleared, and then in S7, the line counter 59 and the character counter 60 are cleared and the program advacnes to S8.

In S8, data stored in the memory 55 for the starting point of printing are transferred to the textual data pointer 52. In S9, textual data stored in the text memory 51 pointed by the textual data pointer 52 are searched and the program advances to S10. If the searched textual data are other code than End code and New Line code and at the same time not data at the end of a line, the program advances, through S10 to S12, to S13, where the character counter 60 is counted up. In S14, the textual data pointer is updated, and then the program returns to S9, and the program from S9 to S14 is repeated thereby to successively search the textual data. In the way of searching, if End code indicating the end of the textual data is detected, the program goes from S10 to S26, and if New Line code (return code) indicating the end of a line is detected, the program goes from S11 to S15. Further, if data at the end of a line are detected or the value of the character counter 60 is equal to the value of the character number memory 57, the program goes from S12 to S21.

In S15, it is judged according to the value of the character counter 60 whether the detected New Line code (return code) is data at the head of a line or not, and if the answer is No, the program adcances to S16, where the new line flag (return flag) 61 is set. In S17, it is judged according to the value of the line counter 59 whether the data in searching is in the bottom line of the second hot zone or not, and if the answer is No, the line counter 59 is counted up in S18. In S19, the character counter 60 is cleared, then the textual data pointer 52 being updated in S20, and the program returns to S9. The program from S9 to S14 is repeated to successively search data in the next line.

In S21, since New line code (return code) or End code is not detected to the end of the line, the new line flag (return flag) 61 is reset, and if the answer is S17 in No in S17, the program goes, through S18 to S20, to S9 similarly to successively search data in the next line.

In S22, since data at the head of the line is New Line code (return code), it is judged whether the new line flag (return flag) 61 is set or not. And if the answer is No, the program goes to S24 where the new line flag (return flag) 61 is set and the program goes to S18. If the answer is Yes, the program advances to S23 where it is judged according to the value of the line counter 59 whether the line including New Line code (return code) is a line in the first or second hot zone or not. If the answer is No, the program goes, through S18 to S20, to S9, ands the program from S9 to S14 is similarly repeated.

When the textual data to the bottom line of the second hot zone stored in the text memory 51 are successively searched as above mentioned, the program goes, through S11 and S15 to S17 or S12, S21 and S17, to S25. Then the value of the line number memory 56 is transferred to the line counter 59 so as to print the textual data in predetermined lines in a page, and in S26, the value of the first feed amount memory 64 (the first line feed amount) is stored in the second feed memory 65. Then the program goes to S28.

If New Line code (return code) is detected in the way of the first or the second hot zone and at the same time a line including New Line code (return code) at the head thereof (a line having no character data) is detected, the program goes, through S11, S15 and S22 to S23, to S27. In S27, the second line feed amount is computed according to the value of the line counter 59 so as to arange data in the lines before the New Line code (return code) uniformly in a printing zone of the current page, and it is stored in the second feed amount memory 65, then the program advancing to S28. In other words, if a line having no character data is detected in the first or second hot zone, the second line feed amount is determined according to the number of lines before the line having no character data in the current page.

If End code is detected in the way of the search, the program goes from S10 to S26, where the first line feed amount is stored in the second feed amount memory 65, then the program advancing to S28.

In S28, data of the memory 55 for starting point of printing is transferred to the textual data pointer 52, and in S29, line of textual data stored in the text memory 51 are transferred to the line buffer 53 with the textual data pointer 52 being successively updated. In S30, each data of the line buffer 53 successively pointed by the print pointer 54 are printed to obtain a line of printed textual data. Then in S31, it is judged whether the end of the printed line of textual data is End code or not. If the answer is No, the program andvances to S32, where line feed by the second line feed amount is carried out according to the second feed amount memory 65. In S33, the line counter 59 is counted down and the program advances to S34. In S34, it is judged whether the value of the line counter 59 is 0 or not, or whether the current one page of textual data have been printed or not. If the answer is No, the program returns to S29, and the program from S29 to S34 is repeated till one page of textual data is printed. After printing one page of textual data, the program advances from S34 to S35, where the page counter 58 is incremented. Nextly in S36, necessary preparations for a new page such as discharging the printing paper on which the textual data are printed and supplying a new printing paper are made, and the program returns to S7, where the text data to be printed in the next page are successively searched. If the end of the printed textual data is End code, the answer in S31 is judged Yes and the program returns to S2.

As abovementioned, if a line having no character data is detected in the first hot zone, lines from the first line of the current page to the line having no character data are arranged in the current page, and lines following the line having no character data, which are originally to be arranged in the current page, are transferred to the next page. Further, if a line having no character data is detected in the second hot zone, lines from the first line of the next page to the line having no character data, which are originally to be arranged in the next page, are transferred to the current page, and the lines following the line having no character data are arranged in the next page. In such a manner, a title, headline or the like in the text is printed at the head of the next page, so that text having a different content from that of the current page is printed from the first line of the next page, thereby to provide documents having apparent distinctions and easy to read.

Further, in the abovementioned embodiment, even if the number of lines of texual data printed in a page changes, the line feed amount (the second line feed amount) is computed according to the changed number of lines and text can be printed uniformly within a printing zone determined by the number of lines set in setting the printing format and the first line feed amount, thereby to provide neat documents having regular printing zones.

In the abovementioned embodiment, the first and the second hot zones are set, but these may be preliminarily set by predetermined value in a control program.

In the above mentioned first embodiment, text processing in Memory mode is described. However, such text processing can be similarly performed in Direct Printing mode in which by entering character data by operating the keyboard 3, printing operation according to the entered character data is directly carried out. For example, by providing only the above mentioned first hot zone, another program can be carried out in which when a line having no character data is detected in the hot zone, automatic page advancing operation, namely, conventionally known automatic paper discharging and paper feeding operation is performed and the following data are printed on a new printing paper.

The second embodiment of the present invention will be now described with reference to FIGS. 5, 6.

In this embodiment, in addition to the abovementioned arrangement of the first embodiment, if vacant lines follow to the last line to be printed in the last page before a distinction of a text, the line pitch in the last page is determined to be the mean value of line pitches in the proceding pages of the entered textual data, thus to prevent the presence of extremely irregular line pitches in documents.

Figure 5:
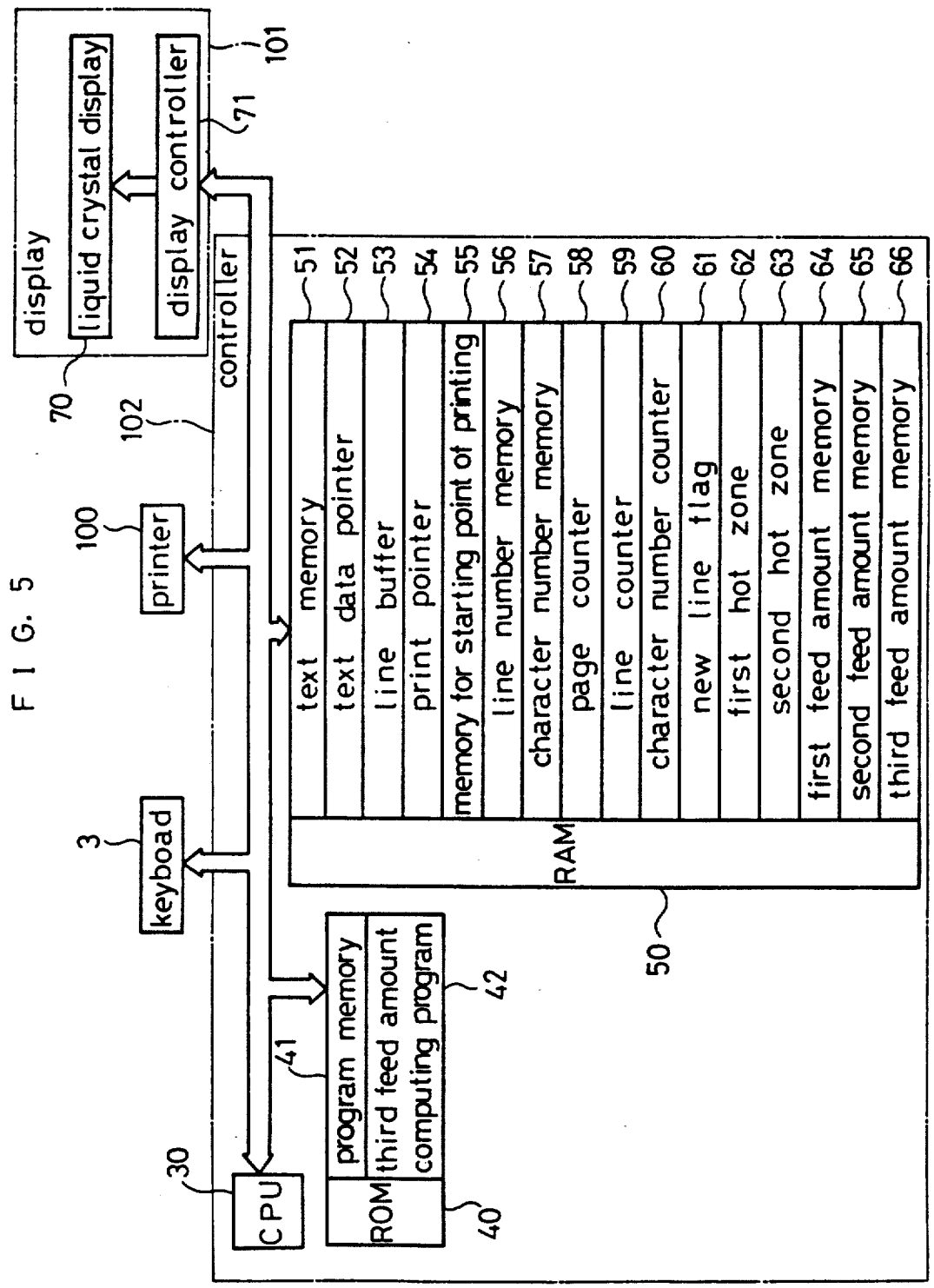
FIG. 5 is a block diagram of a second embodiment of the present invention.
Figure 6A:
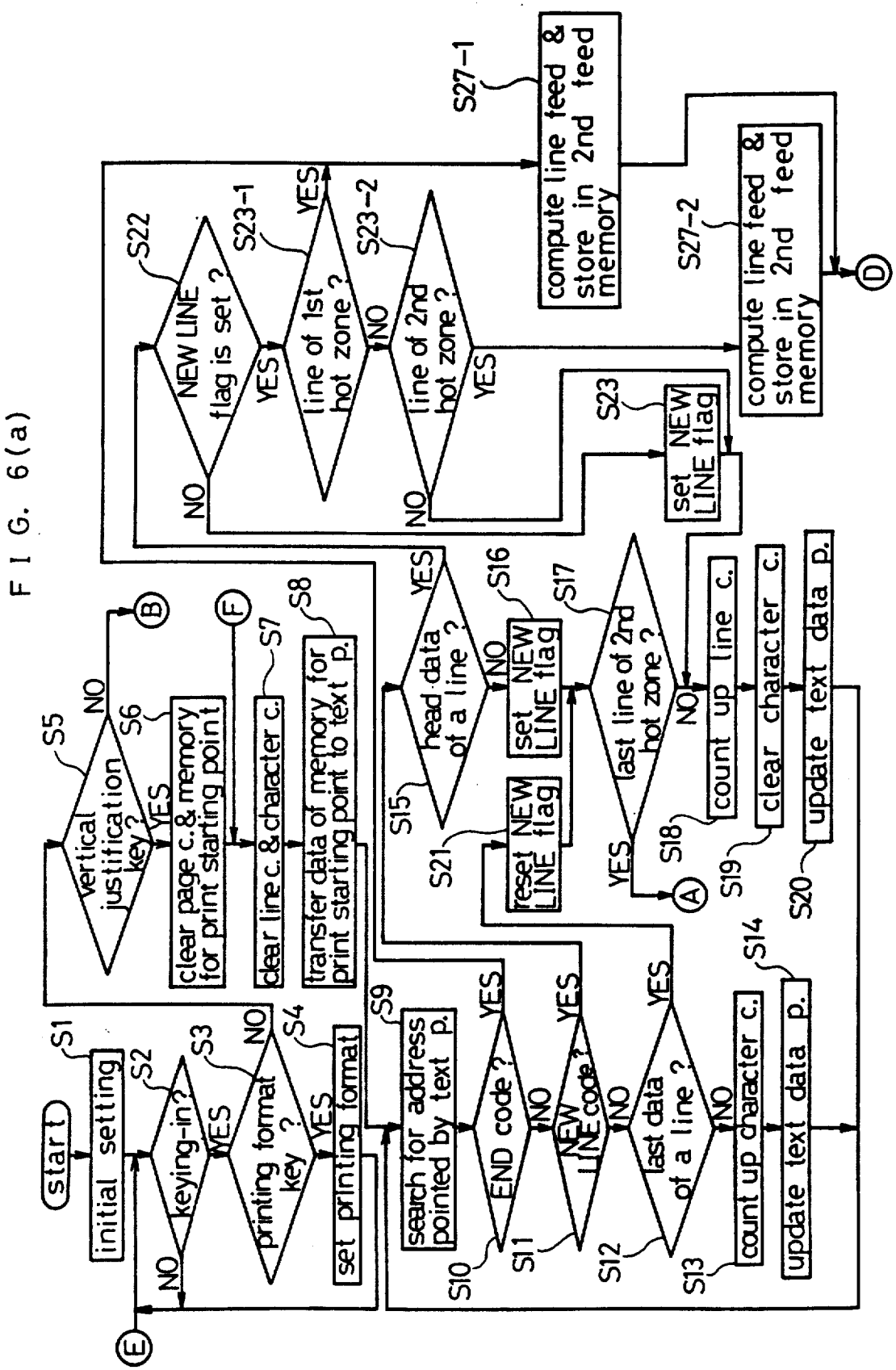
FIGS. 6a, 6b are flow charts of a routine of vertical justification control of the second embodiment.
Figure 6B:
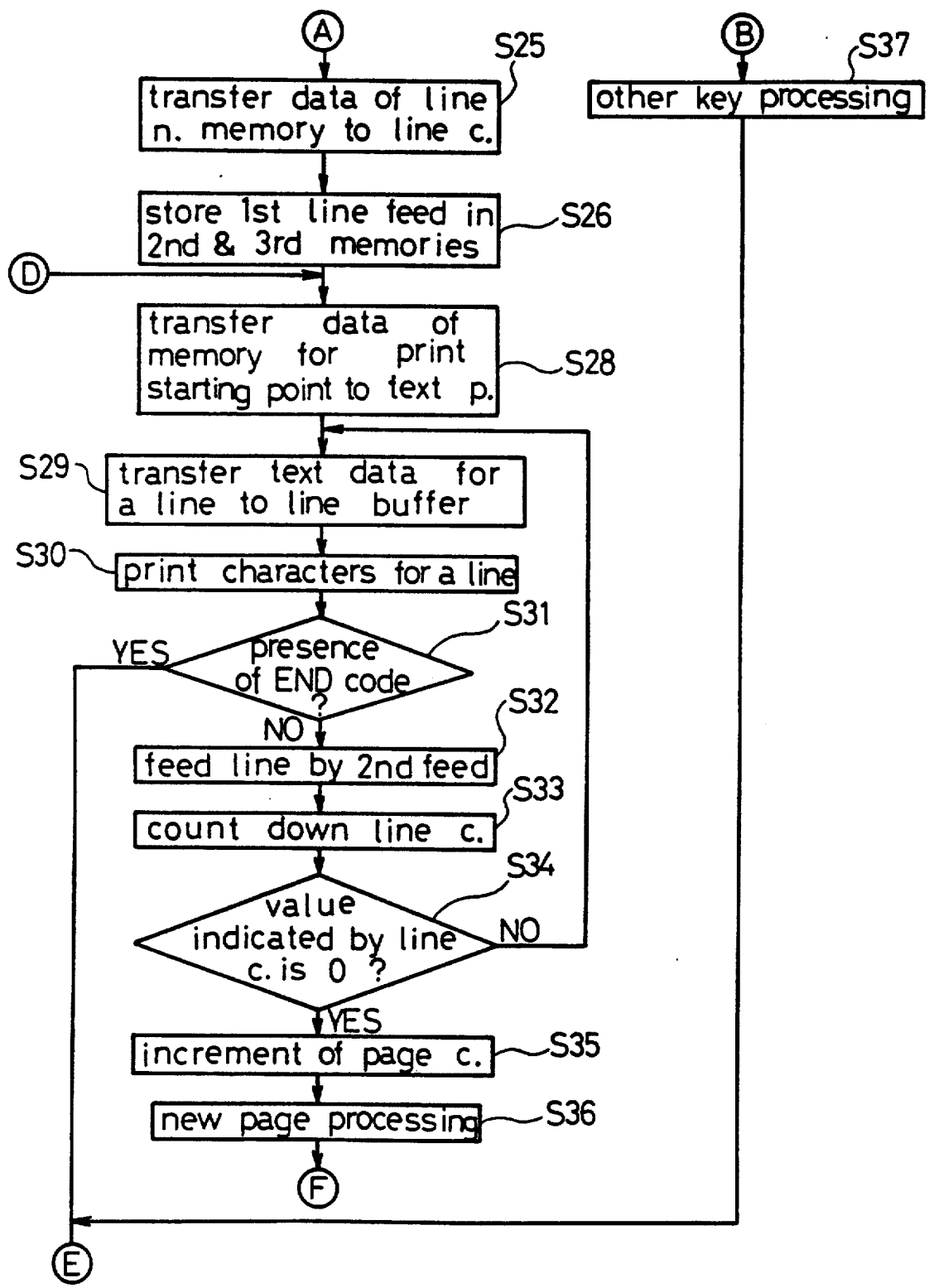

The second embodiment has the following components in addition to the arrangement of the first embodiment, as shown in FIG. 5, RAM 50 has a third feed amount memory 66, and ROM 40 has a program 42 for computing a third line feet amount. In this program 42 for computing a third line feed amount, a program for computing the mean value of the line feed amounts of the pages stored in the third feed amount memory 66 is stored.

Further, in ROM 50, the line feed amount (the second line feed amount) of only the current page in printing textual data of the current page is temporarily stored in the second feed amount memory 65, and all the second line feed amounts respectively of the pages from the first page to the current page are stored in the third feed amount memory 66.

Now, relating to the controlling operation of this embodiment, steps S22 to S27-1 and S27-2 which are different from the steps of the first embodiment will be described with reference to the flow chart of FIG. 6.

If the result of the judgement in S22 is Yes, it is judged according to the value of the line counter 59 whether the line having New Line code (return code) is a line in the first or the second hot zone or not, in S23-1 and S23-2. If the answer is No, the program goes, through S18 to S20, to S9, and similarly the program from S9 to S14 is repeated.

After the textual data to the last line of the second hot zone stored in the text memory 51 is successively searched, the program goes, through S11 and S15 to S17 or S12, S21 and S17, to S25, where the value of the line number memory 56 is transferred to the line counter 50 so as to print the textual data in predetermined number of lines in a page. Nextly in S26, the value of the first feed amount memory 64 (the first line feed amount) is stored in the second feed amount memory 65 and the third feed amount memory 66, and the program goes to S28.

If New Line code (return code) is detected in the way of the first or the second hot zone and at the same time a line including New line code at the head thereof (a line having no character data) is detected, the program goes, through S11, S15, S22, S23-1 and S23-2, to S27. In S27, the second line feed amount is computed according to the value of the line counter 59 so as to arrange data in the lines before the New line code (return code) uniformly in a printing zone of the current page, and it is stored in the second feed amount memory 65 and the third feed amount memory 66, then the program advancing to S28. In other words, if a line having no character data is detected in the first or the second hot zone, the second line feed amount is determined according to the number of lines before the line having no character data in the current page.

If New Line code (return code) is detected in the way of the first hot zone and at the same time a line including New Line code (return code) at the head thereof (a line having no character data) is detected, the program goes, through S11, S15 and S22, to S27-1. In S27-1, CPU 30 recalls the program 42 for computing the third line feed amount in ROM 40, then computes the mean value of the line feed amounts of already printed pages stored in the third feed amount memory 66 and stores the means value in the second feed amount memory 65, then the program going to S28. In other words, if a line having no character data is detected in the first hot zone, the second line feed amount is determined according to the line feed amounts of the pages preceding to the current page.

If End code is detected in the way of searching, the program goes from S10 to S27-1, where the mean value of the line feed amounts of the pages preceding to the current page computed similarly as above mentioned is stored in the second feed amount memory 65, then the program going to S28.

Steps other than those mentioned here are same with the corresponding steps of the above mentioned first embodiment. According to the second embodiment, similarly to the first embodiment, documents having apparent distinctions and easy to read can be obtained, and even if the number of lines printed in a page changes, a new line feed amount (the second line feed amount) is computed according to the number of lines of the current page or to the line feed amounts of the pages preceding to the current page so that textual data can be printed uniformly in the printing zone, thus to obtain neat documents.

In the above mentioned first and second embodiments, textual data are once stored in the text memory 51, and all the textual data stored in the text memory 51 are then rearranged to each page. However, another program can be carried out in which Vertical Justification mode is set by operating the vertical justification key 12 before entering textual data, and then textual data are entered by operating the keyboard 3 and at this time, arrangement of the textual data to each page is determined. The flow chart of this program is one in which keying-in processing is inserted instead of the above mentioned S9, and S14 and S19 are eliminated. Further, Vertical Justification mode may be set only in a specified zone.

Futher, in the above mentioned embodiment, when there is a line having no character data in the first hot zone, textual data following to the line having no character data are arranged to the next page and the line pitch of the current page is determined according to the mean value of the line pitches of all the preceding pages. However, the line pitch of the current page may be determined by the number of the lines arranged to the current page. Otherwise, the lines of textual data corresponding in number with lines carried forward from the preceding page may be successively carried forward to the next page.

A further program can be set in which by providing Printing mode for starting the printing operation only when one page of textual data entered by the keyboard 3 are determined, one page of textual data are regarded as determined when a line having no character data is detected in the first hot zone, and the line pitch of the current page is determined according to the number of the lines of textual data arranged to the current page, and the top and the bottom margins.

What is claimed is:

1. A text processing apparatus comprising:
   a central processing unit;
   input means attached to said central processing unit for entering character data including characters, symbols and function data;
   memory means in said central processing unit for storing character data and function data as entered by said input means;
   printing means attached to said central processing unit for printing entered character data as received from said memory means; and
   control means in said central processing unit for controlling each of said means according to predetermined programs; wherein said control means comprises:
   detecting means for detecting a line having no character data in a predetermined zone in a page of entered character data,
   editing means for transferring at least a part of data in said predetermined zone of a current memory page to the preceding memory page and a following memory page based upon the location of said predetermined zone on the current memory page,
   first line pitch changing means for changing, when at least a part of character data in said predetermined zone of the current memory page are transferred to the preceding memory page, a predetermined line pitch of the preceding memory page according to the number of lines of character data transferred to the preceding memory page,
   computing means for computing a mean value of the line pitches of all the preceding memory pages in which character data are arranged according to the predetermined line pitch or line pitches changed by said first line pitch changing means,
   second line pitch changing means for changing, when at least a part of character data in a predetermined zone of the current memory page are transferred to the following memory page, a line pitch of the current memory page according to the result of the computation by said computing means, and
   output control means for transmitting character data, according to a predetermined line pitch or a line pitch changed by said first or second line pitch changing means, to said printing means.

2. A text processing apparatus as claimed in claim 1, in which said at least one predetermined zone comprises a first zone spreading from a predetermined line of the current memory page to the bottom line thereof and a second zone spreading from the first line of the following memory page to a predetermined line thereof.

3. A text processing apparatus comprising:
   a central processing unit;
   input means attached to said central processing unit for entering character data including characters, symbols and function data;
   memory means in said central processing unit for storing character data and function data as entered from said input means;
   printing means attached to said central processing unit for printing entered character data as received from said memory means; and
   control means in said central processing unit for controlling each of said means according to predetermined programs;
   wherein said control means comprises:
   detecting means for detecting a line having no character data in at least one predetermined zone in a page of entered character data;
   editing means for transferring at least a part of character data in said predetermined zone of a current memory page to one of a preceding memory page and a following memory page based upon the location of said predetermined zone on the current page and the detection of a line having no character data therein;
   first line pitch changing means for changing, when at least a part of data in said predetermined zone of the current memory page are transferred to the preceding memory page, a predetermined line pitch of the preceding memory page according to the number of lines of character data transferred to the preceding memory page;
   output control means for transmitting data, according to a predetermined line pitch or a line pitch changed by said first line pitch changing means, to said printing means; and
   a second line pitch changing means for changing, when at least a part of entered character data in said predetermined zone of the current memory page are transferred to the following memory page by said editing means, the line pitch of the current memory page according to the number of the transferred lines, and said control means transmits entered character data in a line pitch changed by said second line pitch changing means to said printing means.

4. A text processing apparatus as claimed in claim 3, in which said at least one predetermined zone comprises a first zone spreading from a predetermined line of the current memory page to the bottom line thereof and a second zone spreading from the first line of the following memory page to a predetermined line thereof.

* * * * *